United States Patent
Margrain et al.

[15] 3,694,907
[45] Oct. 3, 1972

[54] METHOD OF MAKING LOW INERTIA ROTOR FOR DYNAMO ELECTRIC MACHINES

[72] Inventors: Pierre Margrain; Gerard Lacroux, both of Malakoff, France

[73] Assignee: Etablissements E. Ragonot

[22] Filed: July 6, 1970

[21] Appl. No.: 52,595

[30] Foreign Application Priority Data

July 10, 1969 France......................6923496

[52] U.S. Cl. ....................29/598, 310/195, 310/217, 310/264
[51] Int. Cl. .............................................H02k 15/02
[58] Field of Search .29/598; 310/40 R, 40 MM, 179, 310/195, 217, 264

[56] References Cited

UNITED STATES PATENTS

| | | | |
|---|---|---|---|
| 3,084,420 | 4/1963 | Burr et al. | 29/598 |
| 1,738,166 | 12/1929 | Apple | 29/598 |
| 1,789,129 | 1/1931 | Apple | 29/598 X |
| 3,259,768 | 7/1966 | Burr | 29/598 X |

FOREIGN PATENTS OR APPLICATIONS 955,291    4/1964    Great Britain..............29/598

*Primary Examiner*—Robert L. Spicer, Jr.
*Attorney*—Flynn & Frishauf

[57] ABSTRACT

The complete winding outline of a rotor, including the forward as well as the return conductor of the winding loops are applied, in flat form, to a flexible sheet, as a printed or laminated conductor. The flexible sheet has a fold line, across which the conductor portions forming the coil ends extend. The sheet is then folded along the fold line upon itself and rolled into a hollow cylinder, to form a self-supporting rotor. If desired, an internal support of a plastic, metal tube, or the like can be applied Multiple-layer windings can be formed by first applying the winding outline to the sheet, and then folding the sheet-zig-zag upon itself with additional insulating layers where conductors would contact each other, and then rolling the folded sheet with the conductors thereon into a cylinder.

9 Claims, 13 Drawing Figures

PATENTED OCT 3 1972　　3,694,907

METHOD OF MAKING LOW INERTIA ROTOR FOR DYNAMO ELECTRIC MACHINES

The present invention relates to rotors for dynamo electric machines, and more particularly to low-inertia rotors utilizing printed, or laminated circuit techniques in their manufacture.

Servo and control motors, particularly motors used in data processing equipment require rotating elements which have as low an inertia as possible, so that they can rapidly reach a stable commanded speed from rest, or from any other speed. Such motors are also needed to control tapes, particularly for tape transport in computer equipment which have high start-stop requirements with extremely low inertia.

Various types of motors with low inertia have been developed. A particularly useful type employs a rotor formed as a hollow cylinder which rotates within an air gap of a magnetic circuit which is fixed. The winding of the rotor is formed of coils having a single loop formed as printed or laminated circuits. Laminated circuits should be understood to mean circuits in which conductive strips are applied to an insulating support base, for example, by adhesives, crimping or other methods known in the art.

Rotors of the type forming a hollow cylinder are usually made by first preparing an outline, that is a printed (or laminated) drawing of the windings as a printed circuit and carrying the conductors for current flowing in one direction and then the return conductors. The two outline drawings, first flat, are then placed over another, rolled in cylindrical form, and then interconnected at their terminal ends in order to form the loops of the windings. This method of assembling requires two interconnections; one at the rear face, where the forward and the return current carrying windings are interconnected and the other on the forward end, which may also be called the "collector end." Difficulties have been experienced in making the connections, particularly in making the connections at the back end where the windings are to be interconnected, which difficulties have been solved only by manually interconnecting one conductor after the other in the region of their junctions.

It is an object of the present invention to provide a rotor, and a method of making the rotor of low inertia, in which the windings are formed by printed or lamina circuits, and which do not require extra interconnections.

SUBJECT MATTER OF THE PRESENT INVENTION:

Briefly, the outline of the conductors for an entire winding is applied to a printed or lamina circuit support which is flexible, and has a bending or a hinge line, across which the conductors extend. The support, with the conductors thereon is then folded across the break or bending line, the conductor thus forming an integral loop. Thereafter, the folded support with the conductors thereon is rolled into cylindrical form, the forward current carrying and return current conductors being separated by two thicknesses of the insulating support. The break or bend line, in form of a hinge, is bridged by the connecting portions of the winding loops at the rear (that is away from the commutator) end of the coil, the forward end being shaped to form a collector extension. The assembly is then preferably applied to a hollow cylinder which may be plastic, resin, reinforced fiber material, cellulose material, ceramics or metal.

The hollow support cylinder is metal, and it is preferably made by electrolytic deposition about a mandrel which is later removed; the mandrel itself may consist of a central core of tough material surrounded by a metallic covering material having a low melting point which is readily removed.

The rotor may be secured together by adhesives, or may be adhered about a cylinder; to effect good curing of adhesives used, the rotor with its support cylinder is placed on a mandrel and the entire assembly inserted into a ring-shaped pressure chamber having a rubber bladder which upon being charged with compressed air or other compressed fluid will tightly surround the rotor to bond the adhesives used and the rotor into a unitary whole. The rotor may be covered with banding, of insulating material, insulated metal sleeves or the like.

Figure 4:
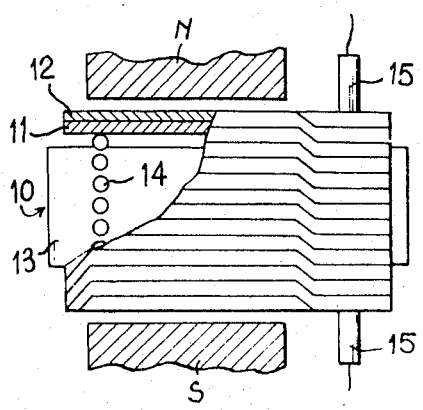
Figure 3:
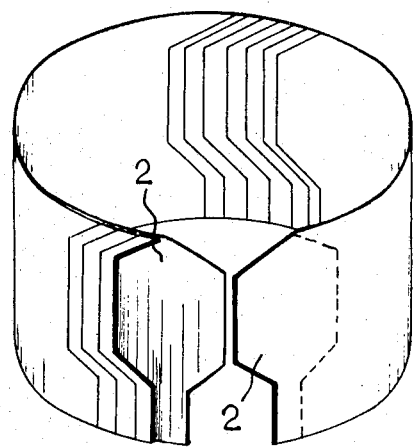
Figure 5:
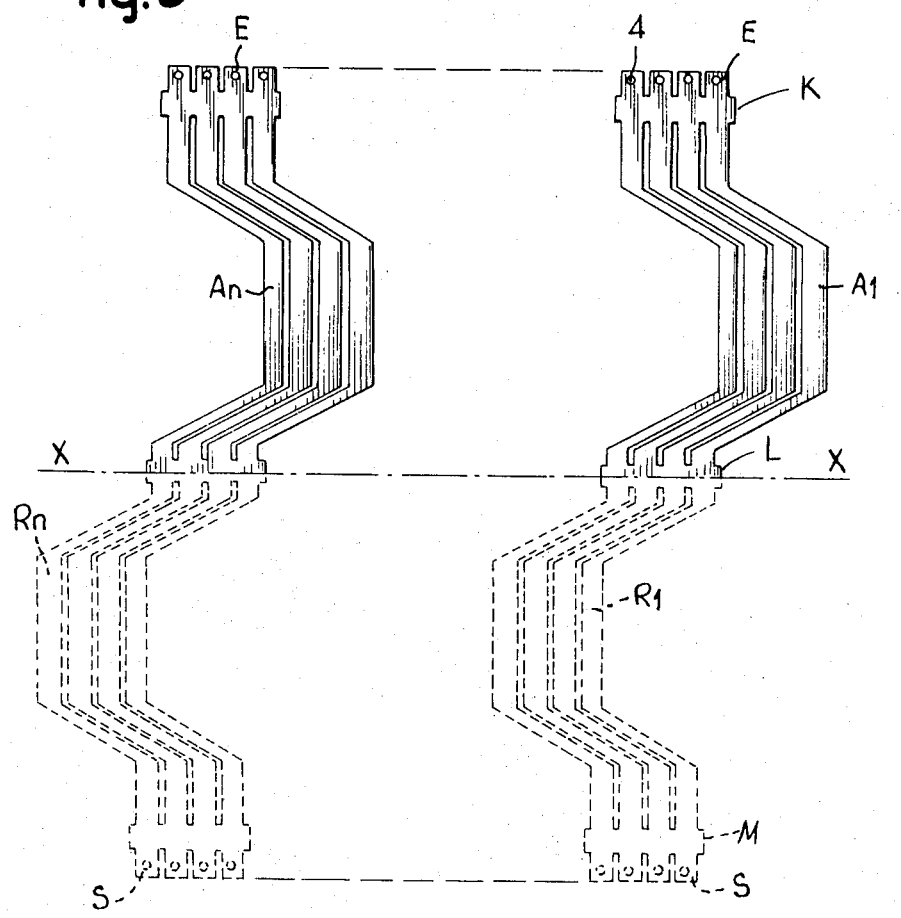
Figure 6:
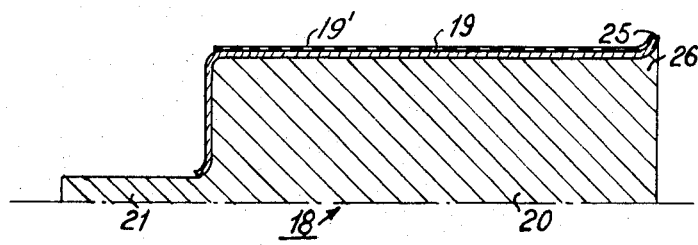
Figure 8:
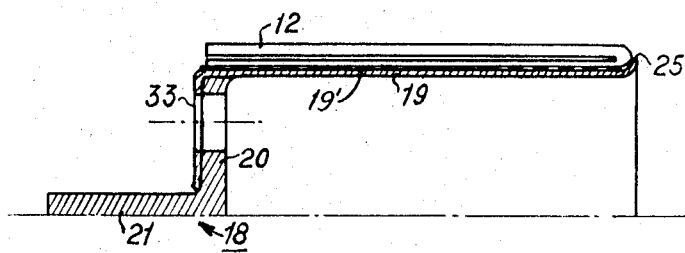
Figure 9:
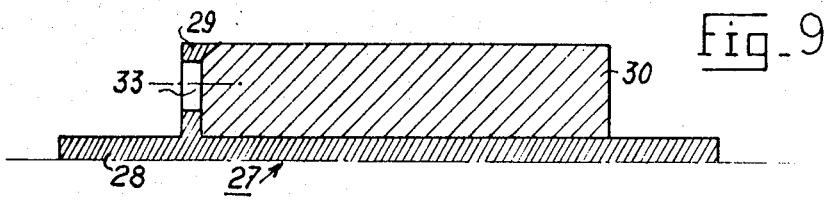
Figure 10:
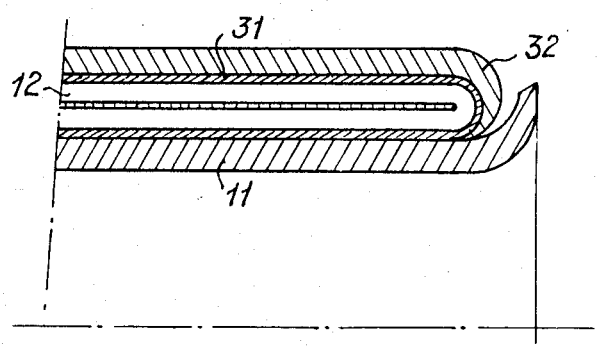
Figure 7:
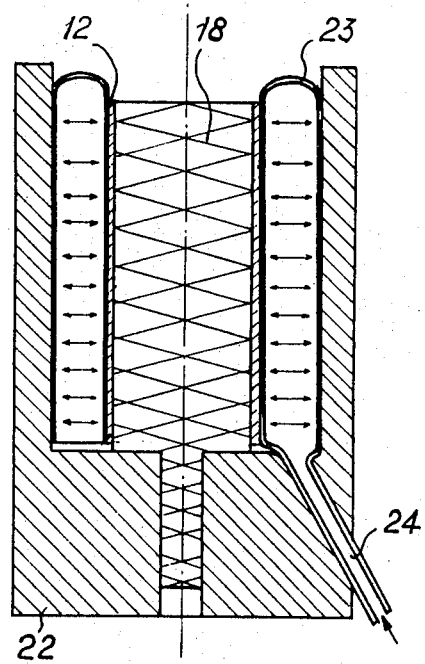
Figure 12:
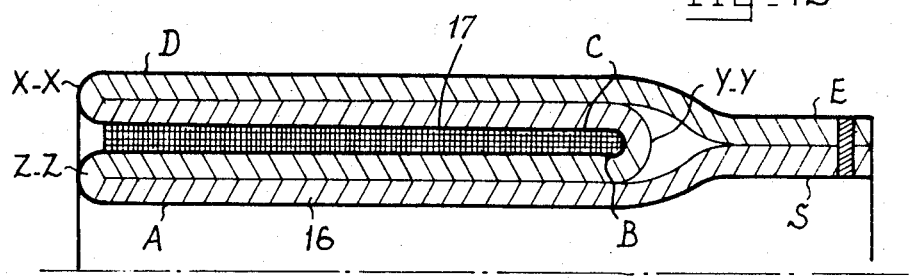
Figure 13:
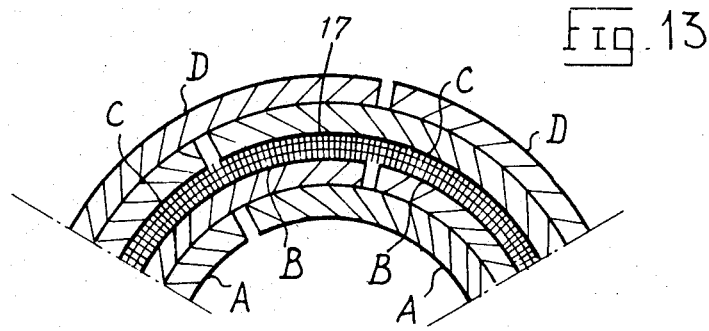
Figure 11:
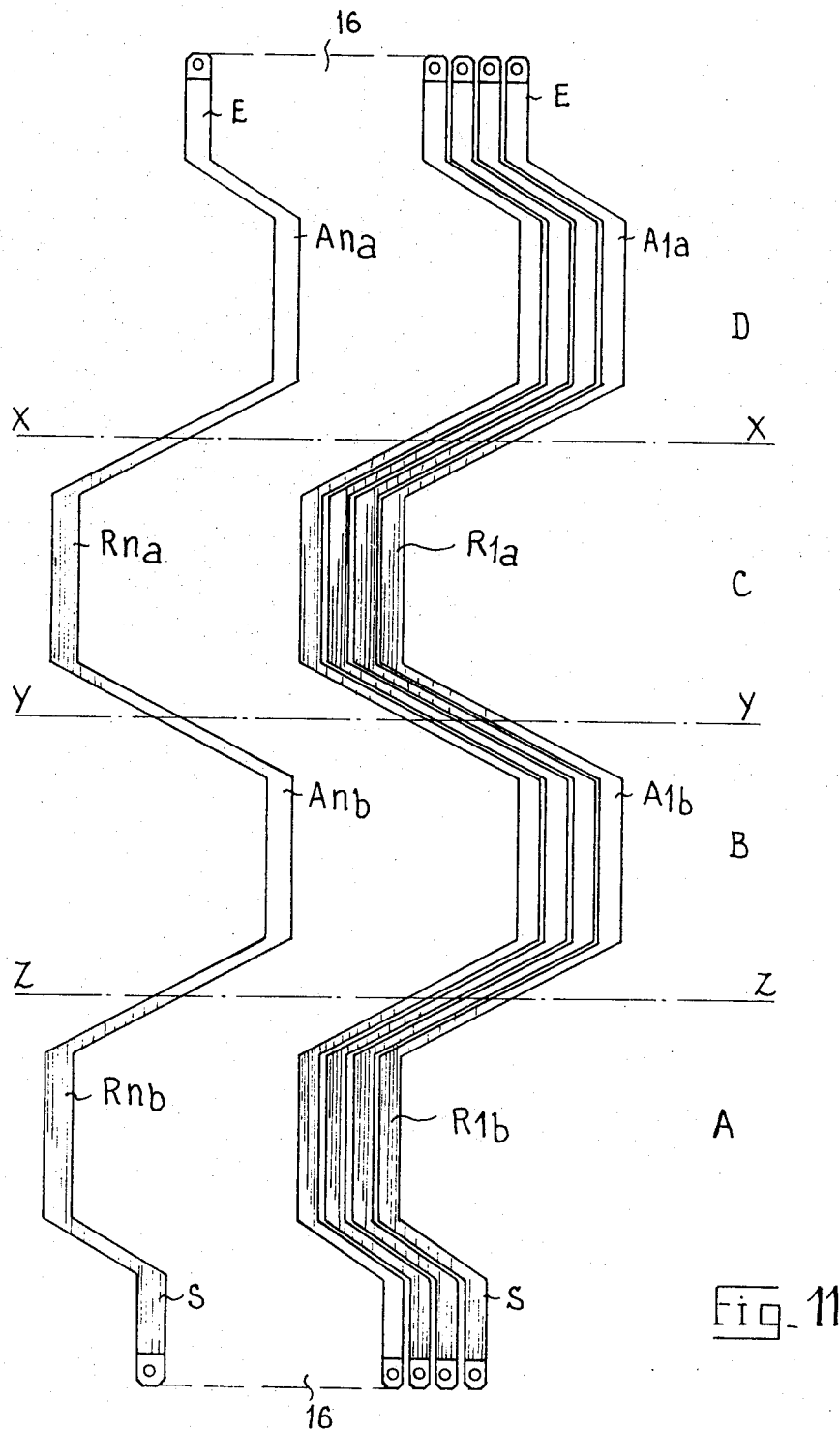

FIG. 3. illustrates an almost completed rotor in perspective view;

4 is a longitudinal, partly broken away and cross-sectional view of a rotor assembled in a machine, shown in schematic form;

FIG. 5 is a top plan view of the lay-out of the windings in accordance with a different embodiment;

FIG. 6 is a partial schematic cross-sectional view, in longitudinal section, of the hollow metal cylinder being applied to a mandrel which has not yet been removed;

FIG. 7 is a schematic longitudinal view through a pressure chamber illustrating a step in the process of manufacturing a complete rotor;

FIG. 8 is a partial longitudinal cross-sectional view, in section, of an assembly of a support cylinder and winding after the process of FIG. 7 has terminated;

FIG. 9 is a schematic longitudinal half cross-sectional view of a core and mandrel in accordance with another embodiment of the present invention;

FIG. 10 is a partial cross-sectional longitudinal view to a greatly enlarged scale of a rotor of FIG. 4, which is banded with a metal band;

FIG. 11 is a lay-out drawing for a multi-layer winding;

FIG. 12 is a partial longitudinal cross-sectional view of one multi-layer winding, after folding of the circuit of FIG. 11; and FIG. 13 is a partial transverse cross-sectional view of the coil of FIG. 12 showing how the conductor layers, among each other are interconnected.

The type of rotor to which the present invention relates is best seen in FIG. 4. The hollow cylinder 11 has coil windings 12 mounted thereon. An air gap is formed between two magnets generally, schematically indicated as N and S and a central core 13. A bearing such as balls 14 within a bearing race, not shown, provides for rotation of the rotor assembly 10 consisting of the cylinder 11 and windings 12, with respect to core 13. A pair of brushes 15 run on a commutator, the elements of which may be formed by straight terminal portions of the conductor forming the winding.

The armature 12 is of the type generally known as "interlaced" and is formed of individual winding units, each one of one or more layers. Since the winding arrangement itself is well known, it will not be described again in detail but a brief review will be given of the winding lay-out to define the type of armature described in detail.

Figure 1:
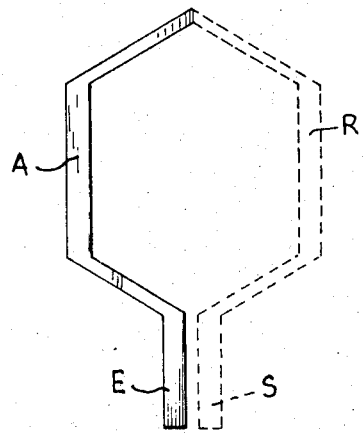
FIG. 1 illustrates, a plan developed view of a complete loop of a winding for the rotor of a dynamo electric machine.

FIG. 1 illustrates a coil formed of a single winding. In this winding, a "going" conductor A (shown in full lines) is connected to a straight input portion E. It is connected by means of a rear bridge to a "return" conductor R shown in broken lines, having a straight output terminal portion S. For purposes of further description, the input and output portions E, S will be termed "the forward" portion and the interconnecting bridge "the rearward" portion of the winding.

A number of identical coils are arranged, all around the rotor overlapping one above the other in such a manner that the forward, or "going" conductors all are located next to each other in the longitudinal sense of the rotor, however, in two layers, only one of which is formed by the going conductors A. The second layer is formed by the return conductors R. The input connection of each coil which is on one of the layers is connected to the output of an adjacent coil of the other layer, thus, giving a complete endless winding closed in itself, and generally termed an interlace wound armature. This type of armature is selected as an example, although the invention is applicable to any kind of armatures, particularly to those in which the conductors have two layers.

Figure 2:
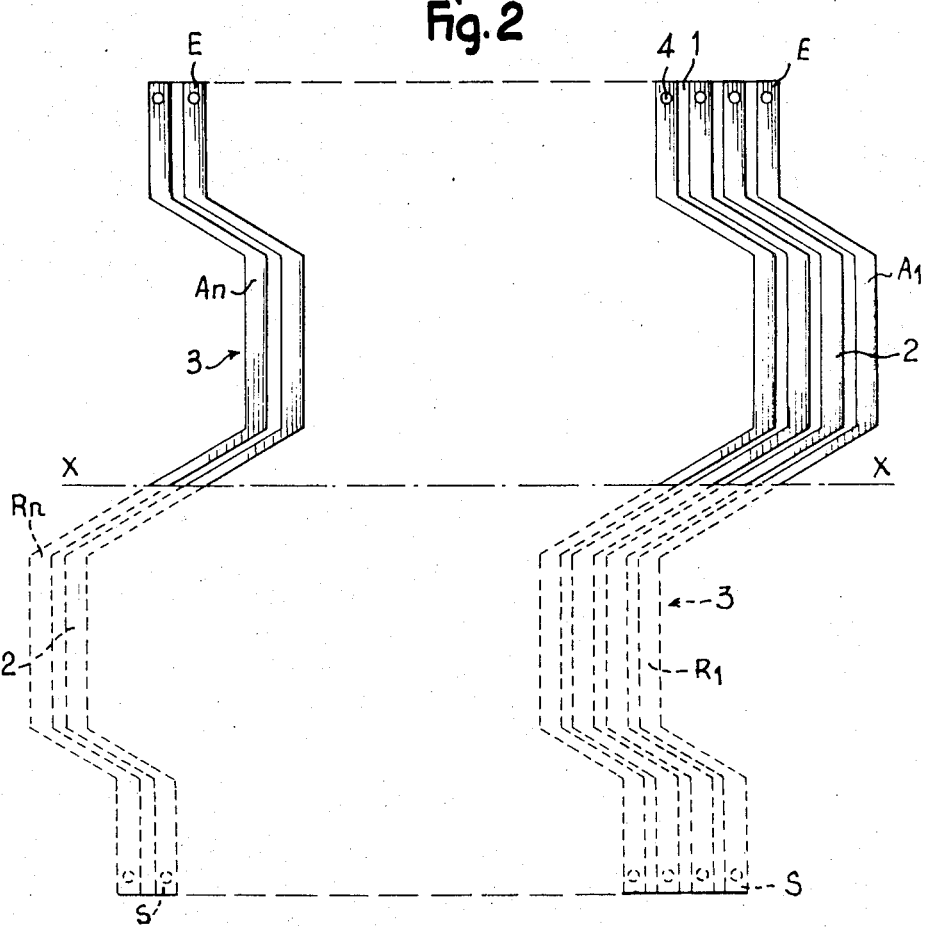
FIG. 2 is a developed plan view of the outline shape of a printed or laminated surface, with some conductors thereon, forming one embodiment of a starting point in making the rotor in accordance with the present invention.

In accordance with the present invention, the outline of the armature 12 is first provided on a flat sheet of printed circuit such as shown in FIG. 2. The carrier for the printed circuit is a thin, flexible sheet material having a conductive surface applied to one side, for example, copper. The copper may be in sheet form printed, or laminated thereto. It is engraved in accordance with the image of the entire winding to be applied, that is the terminal end portions E, the going conductor A, the connecting bridge at the back of the armature, the return conductor R and the final terminal portion S. A group of forward conductors $A1 \ldots A_n$ as well as the return conductors $R^1 \ldots R_n$ of armature 12, when developed and in plain view, will appear as shown in FIG. 2. Taking the axis X—X of this representation as a hinge point, and doubling over the broken line portion, one obtains a flat sheet of two superimposed layers, which form the conductors. It is readily seen that the array of conductors forms a family of zig-zag, parallel tracks, the array of one side of the hinge X—X having the same longitudinal dimension as the other portion, but at opposite sense of curvature, with respect to the left-right direction of FIG. 2. Each one of these tracks will then represent a going conductor and a return conductor, respectively, of the armature and thus, form one winding of armature 12.

In order to form a cylindrical armature, by means of the circuit assembly of FIG. 2, end portions of the insulating support 1 are cut to match the outlines of the first and last of the conductors A1-R1 and $An-R_n$. Thereafter, the flat sheet is folded along hinge X—X so that the insulating sheet will be at the interior of the fold. The insulating sheets can then be adhered together, and the flat, folded form is rolled by hand or over a cylindrical mandrel into form of a cylinder in which the first conductors A1-R1 will be alongside that with the respective last conductors An-Rn. FIG. 3 illustrates, that due to the curvature in the cylinder, several of the "going" conductors A will define the projecting portion 2, whereas those of the return legs R1 . . . will define a hollow or indented portion 3, inverse to the projecting region 2. The last going conductors An . . . as well as the return conductors Rn . . . will be, with respect to the first ones, reversely indented or projecting. When the first and the last conductors are juxtaposed, the projections 2 will match exactly within the indentations 3 and can be placed above the other. Since the insulating face of the carrier having the original design is folded interiorly, the projections 2 will be placed insulation, against insulation and, upon adhering together the entire assembly into a closed cylinder, the circuit of FIG. 2 is transformed into hollow cylinder having practically no trace at the junction. The exterior face of the cylinder will support one of the layers of conductors, for example, the going conductors, whereas the interior face will support the other layer of conductors, that is the return conductors. The two layers are thus, naturally insulated from the other. There is no interruption between going and return conductors of any one winding. Nevertheless, the winding terminals are free at the collector side. An input terminal of each winding is opposite the output terminal of an adjacent winding, in a suitable position for their interconnection. A simple way to interconnect the terminal strips electrically consist in forming a small opening 4 in the printed of lamina circuit, and then filling these holes with a small plug of connecting metal, such as tin which can be obtained by dipping the terminal ends in a solder bath, or placing a small grain of copper through the holes providing for adhesion, for example, by compression, heating or other suitable methods. The holes 4 may be pierced in the circuit in flat form, at the same time when the circuit outline is engraved or otherwise manufactured. In general it is not necessary to provide a special connecting element of the windings of armature assembly 12 to a separate collector, since the straight conductive portions which form the input and output terminals E, S, respectively, may directly serve as the tongues of the collector (see FIG. 4).

Armature 12 as described, utilizes a support for the printed circuit which is thin and plyable and which can be readily bent, as well as being rolled in cylindrical form. It may, for example, be a sheet of polyester, Mylar or the like of several tens of microns in thickness. The copper sheet on the support may have any desired thickness, depending on the current carrying capacity required of the armature 12 and by the width of the air gap in which the armature 12 is to operate. In order to utilize the terminal ends of the windings as the collector tongues, the thickness of the terminal ends can be increased by electrolysis at the point where the brushes will track, particularly when the thickness of the copper conductors forming the winding is very small, such as several microns only.

Embodiment of FIG. 5: The outline of the armature 12 is cut flat from a single sheet of metal, such as copper. Conductors A1 . . and R1 . . have the same general form as that shown in FIG. 2; they are interconnected together by small metal tabs, KLM located conveniently and preferably at the terminal end regions E, S, respectively, as well as at the level of the hinge X—X. The interconnection of the conductors among each other prevents deformation and spreading apart; interconnection at three points permits ready handling of the cut sheet of copper. In order to form the armature by means of a copper sheet, it is folded in half along the hinge X—X, and bent round over a cylindrical mandrel, or directly over a hollow cylinder 11. After being shaped, a thin insulating tube is placed in the interior of the fold, that is between the layers of going conductors A and the return conductor R. Thereafter, input and output conductors are interconnected, and then the small tabs K, L, M are cut to sever the conductors both at the collector end, as well as at the rear end of the armature.

In accordance with a variation, the sheet of copper is cut and adhered to an insulating, flexible sheet before being bent, and then bent along hinge axis X—X and shaped as before.

Embodiment of FIGS. 11 and 12: To make a multilayer armature 12, flat winding outline in accordance with FIG. 11 is prepared again as a printed circuit similar to the embodiment of FIG. 2, with interconnected groups of conductors as described in connection with FIG. 5. A plurality of going and return conductors will be provided; as seen in FIG. 11, the going conductors $A_{1a}$-$A_{na}$ are connected to return conductors $R_{1a}$. . . $R_{na}$ to going conductors of the second layer $A_{1b}$. . . $A_{nb}$ and in turn to the return conductors of the second layer $R_{1b}$. . . $R_{nb}$. As first fold, the conductors are then hinged about axes X—X and Z—Z to form the going and return conductors of the two layers with supporting insulating material 16 therebetween, similar to the insulating material 1 of FIG. 2, or, if the conductors are made of interconnected strips of copper, for example, a sheet insulating material can be interposed to separate the going and return conductors. Thereafter, a bend in the opposite direction is formed above hinge axis Y—Y with an insulating sheet 17 (FIG. 12) therebetween. The array of conductors forms as group of tracks in zig-zag parallel arrangement. Each one of the conductive tracks represents going and return conductors of a coil having two windings. Only the going conductors of the first winding, $A_{1a}$. . . $A_{na}$ and the return conductors of the last winding $R_{1b}$. . . $R_{nb}$ have terminal ends which are straight in order to form the input and output portions E, S of the coils. Input E may, directly, form also the commutator segments.

The embodiment of FIG. 11 is similar to that of FIG. 2, except that it has two windings. Similarly, insulating support film 16 is cut in accordance with the outline of the terminal conductors $A_{1a}$ - $R_{1a}$ - $A_{1b}$ - $R_{1b}$ and $A_{na}$ - $R_{na}$ - $A_{nb}$ - $R_{nb}$ The outline pattern, just cut, may then be folded along hinge Y—Y with the conductors facing each other (that is the insulating sheet at the outside), and the insulating sheet 17 is interposed and the layers of windings are then adhered together (see FIG. 12). The pattern is folded back upon itself upon axes X—X and Z—Z. The going conductors of the second layer $A_{1b}$. . . $A_{nb}$ and the return conductors of the first layer $R_{1a}$. . . $R_{na}$ are thus separated by the insulating sheet 17. After adhesion together of all insulating sheets, various layers of the conductors will be superposed as illustrated in FIG. 12. The entire assembly folded and adhered together is then rolled in the form of a cylinder, ends are covered as best seen in FIG. 13 and fixed by adhesives.

Armatures having a larger number of winding layers than two may be made in similar fashion. The embodiment described in connection with FIG. 11 and 12, shows the winding layers folded along fold hinge lines, with insulating sheets interposed between adjacent layers of conductors. Insulating sheets may be either the support for the conductors themselves or may be separate sheets similar to sheet 17, inserted flat and in tubular form after the winding arrangement has rolled into a cylinder.

The armature sub-assembly 12 in accordance with the invention is mounted on a hollow cylinder 11 (FIG. 4) to form the low inertia rotor assembly 10.

The hollow cylinder 11, in accordance with the invention, must be very light so that its inertia does not substantially increase that of the armature assembly. It must be sufficiently thin to take up little space in the air gap and, additionally, must be sufficiently rigid to retain a circular shape. Cylinder 11 may be of plastic material, cellulosic material, or resin-reinforced fiber material, or of metal, if the exterior surface thereof is protected by an insulator. In case good heat removal from the armature is desired, cylinder 11 may also be made of beryllium oxide, a ceramic having a heat conductivity which is almost equal to that of copper. If cylinder 11 is made of metal it should, preferably, have one or several of the following characteristics: It should be capable of being applied by electro deposition in a thin layer having low internal tension, that is less than 100kg. per square cm. For example; it should have good mechanical strength, that is be very rigid, resistant to compressive forces, and have a high Young modulus, while having a low volumetric mass; and it should have a high electrical resistivity so that the rotor, in operation, will have little eddy current losses.

A suitable metal is nickel. A hollow metallic cylinder 11, made of nickel, can be made in accordance to the present invention, as follows (with reference to FIG. 6); a layer 19 is electrodeposited in a nickel sulfamate bath or a similar bath. Layer 19 will have a homogeneous thickness in the order of from 0.25 to 0.30 mm. applied on a tough cylindrical core 18, such as soft iron. Core 18 has a cylindrical body 20 and a coaxial cylindrical extension 21 which functions as mechanical axis first for the entire core 18 during the manufacture of the hollow cylinder 11, and then may function as a shaft for the hollow cylinder 11.

Core 18, with its exterior layer 19 of nickel is carefully machined for roundness. Nickel layer 19 on core 18 is covered with adhesives and insulating resin 19 and then the armature 12, previously folded, is rolled thereon. The superimposed layers of the armature are adhered together. The armature itself may form as previously discussed in connection with FIGS. 2, 5, or 11. After adhering the end portion of the winding array of armature 12, the entire sub-assembly of core-nickel coating - winding is located in a pressure chamber 22 (FIG. 7) in which an internally hollow pressure bladder 23 is inserted. Pressure bladder 23 is inflated through a duct 24 to apply itself snuggly against the outside of the sub-assembly armature 12 - layer 19 - core 18, to remain there for at least a part of the period of time of polymerization of the adhesive resin, or during another adhesion process. Heat may be supplied if desired.

The sub-assembly: Core 18 - layer 19 (with applied insulation 19') - armature 12 is then removed from the pressure chamber 22 and machined to remove almost, or all of the cylindrical material 20 of core 18 (FIG 8) leaving, however, the nickel layer 19 in tact. This may be accomplished by means of mechanical machining, finished by chemical attack. Nickel layer 19 and the remaining portions of core 18 (FIG. 8) will then form the hollow cylinder 11 illustrated in FIG. 4 and referred to in the preceding description.

For improved rigidity, the nickel layer 19 may be formed with a bulged up cylindrical edge 25 (FIG. 6 and 8). The core 18 itself may already be formed with an enlarged end portion 26 (FIG. 6) to effect deposition in the shape shown to an enlarged scale in FIG. 10.

In accordance with the present invention, the core in which the hollow cylinder will be obtained may be similar to core 27 (FIG.9) which is partially composed of tough metal and partially a metal having a low melting point, in order to facilitate removal of the cylindrical body which is not necessary, after the layer 19 of nickel, or another metal of suitable characteristics, has been applied on the core. Core 27 has a central shaft 28 and disc-like end portion 29, also of tough metal, as well as a cylindrical body of low-melting point metal, or alloy; a melting temperature of from 100° C. to 130° C. is suitable.

After the roundness of the core 27 is accurately established, it is first covered with a thin layer of copper, for example, by electrodeposition, and then covered with a layer 19 of another metal such as nickel. Nickel layer 19 has the armature 12 applied thereto as described previously. The sub-assembly: Nickel-covered core 27, and insulation; and armature 12 is then if desired, inserted in the pressure chamber (FIG.7); to remove the metal, it is subjected to a temperature just above the melting point of the metal, or the metal alloy forming the cylindrical body 30. The metal forming body 30 is carved out, leaving intact the layer 19 of nickel with an internal thin film of copper. Any residual low-melting point metal is removed by machining. The copper base film forming the plating substrate may either remain, or may be removed chemically.

Rotors 10 which are to operate at high speed preferably are banded on the outside. In accordance with the invention, and exterior insulating layer 31 covers the conductor of armature 12, which for mechanical strength may be metalized in accordance with electrodeposition techniques, for example, by a thin layer 32 of a metal such as nickel (see FIG.10). In order to make the hollow cylinder 11 as light a possible, relief holes 33 (FIG. 8 and FIG. 9) may be pierced through the end faces, so that it will function similar to a spider.

As had been seen, the motor is easily manufactured from a flat, plain sheet. The lay-out of the conductive strips to form the windings may be carried out by well known printed circuits or laminated circuit techniques on a flat surface, which are then folded as desired. Contrary to the prior art, which requires separate manufacture of going and return conductors, and interconnection of the windings both at the commutator end as well as at the rear end of the armature, the present invention provides a rotor structure and a method of making such a rotor in which the number of parts to be handled and to be made is decreased, thus, substantially facilitating alignment and interconnection of the separate parts. The only interconnection to be made is the collector side. In accordance with the invention, the two terminal conductors of the armature assembly, when rolled in a cylinder, match exactly without necessity of providing interconnection of the conductors of the windings, one each, thus omitting additional connection points and simplifying manufacture and assembly.

The present invention has been described specifically in connection with single and multi-layer windings armatures having interlaced windings; other winding systems, and different winding arrangement may be used within the scope of the inventive concept.

We claim:

1. Method of manufacturing low inertia rotors for dynamo electric machines comprising providing an array of unitary, integral conductor lines in plan outline and having a central fold line (X—X), said conductor lines being arranged in plan outline of complete winding loops and having a first slating portion to form the end of the winding, a straight portion essentially transversed to said fold line to form a first active portion of the winding loop; second and third slanting portions, extending up to, through, and beyond said fold line respectively; a second straight portion essentially transverse to said fold line to form a return active portion of the winding loops; and a fourth slanting portion forming the other end of the winding;

applying at least said first and second slanting portions and said first straight portion to a sheet of insulating material;

folding said conductor lines about said fold lines so that said conductor portions will lie opposite each other separated by said sheet of insulating material;

rolling said folded conductor lines with said insulating sheet into cylindrical form;

securing terminal ends of said sheet with said conductor lines thereon together to retain cylindrical form;

electrodepositing a layer of metal (19) on a cylindrical support (18, 27) to form a cylindrical metal layer;

placing said folded cylindrically-formed sheet with said conductor lines thereon on said electrodeposited cylindrical metal layer; and removing at least a major portion of said cylindrical support while leaving said cylindrical metal layer to form a hollow, low inertia, composite cylindrical rotor structure.

2. Method according to claim 1, wherein said support comprises a tough metal including soft iron.

3. Method according to claim 1, wherein said support comprises a composite of a central cylindrical body of tough metal and a cylindrical covering of a metal of low melting point.

4. Method according to claim 3 comprising the further step of first depositing a cover layer on the cylindrical body of low melting point metal before electrodepositing said layer of metal (19).

5. Method according to claim 1 including the step of applying an insulating layer (31) to the exposed surface of said conducting line at the outside of said cylindrically formed sheet;

and banding (FIG. 10-32) the outside of said cylindrically formed sheet.

6. Method according to claim 5, wherein the step of banding comprises the step of electro-depositing a metallic layer on the outside of said insulating layer (31) covering the exposed conductive lines.

7. Method of manufacturing low inertia rotors for dynamo electric machines comprising providing an array of unitary, integral conductor lines in plan outline and having a central fold line (X—X), said conductor lines being arranged in plan outline of complete winding loops and having a first slanting portion to form the end of the winding, a straight portion essentially transversed to said fold line to form a first active portion of the winding loop; second and third slanting portions, extending up to, through, and beyond said fold line respectively; a second straight portion essentially transverse to said fold line to form a return active portion of the winding loops; and a fourth slanting portion forming the other end of the winding;

applying at least said first and second slanting portions and said first straight portion to a sheet of insulating material;

folding said conductor lines about said fold lines so that said conductor portions will lie opposite each other separated by said sheet of insulating material;

rolling said folded conductor lines with said insulating sheet into cylindrical form;

securing terminal ends of said sheet with said conductor lines thereon together to retain cylindrical form by inserting said rolled, cylindrical sheet about a mandrel (19, 18, 27);

inserting said mandrel with said rolled sheet and conductive lines thereon into a pressure chamber having a resilient ring-shaped pressure bladder (23) of flexible material;

and applying a pressure fluid inside said bladder to apply uniform pressure to the outside of said cylindrically rolled sheet and against said mandrel.

8. Method according to claim 7, including the step of applying an insulating layer (31) to the exposed surface of said conducting line at the outside of said cylindrically formed sheet;

and banding (FIG. 10-32) the outside of said cylindrically formed sheet.

9. Method according to claim 8, wherein the step of banding comprises the step of electro-depositing a metallic layer on the outside of said insulating layer (31) covering the exposed conductive lines.

* * * * *